United States Patent
Held et al.

(10) Patent No.: US 7,644,840 B2
(45) Date of Patent: Jan. 12, 2010

(54) VALVE ASSEMBLY FOR VISCOUS FLUID DISPENSERS

(75) Inventors: Micha Alexander Held, Delft (NL); Arthur Frans Van der Knaap, Den Haag (NL); Marcus Johannes Voskuil, Oegstgeest (NL)

(73) Assignee: Fluid Management Operations LLC, Wheeling, IL (US)

( * ) Notice: Subject to any disclaimer, the term of this patent is extended or adjusted under 35 U.S.C. 154(b) by 0 days.

(21) Appl. No.: 11/098,935

(22) Filed: Apr. 5, 2005

(65) Prior Publication Data

US 2006/0175571 A1 Aug. 10, 2006

Related U.S. Application Data

(63) Continuation-in-part of application No. 11/051,709, filed on Feb. 4, 2005, now abandoned.

(51) Int. Cl.
*F16K 11/087* (2006.01)

(52) U.S. Cl. .................. 222/135; 222/385; 251/174; 251/180; 251/192; 251/315.03

(58) Field of Classification Search ............ 251/174, 251/180, 192, 315.03, 181, 315.01, 314; 222/135, 137, 385, 401, 136
See application file for complete search history.

(56) References Cited

U.S. PATENT DOCUMENTS

| | | | | |
|---|---|---|---|---|
| 743,511 | A | * | 11/1903 | Huxley ................. 251/174 |
| 1,584,600 | A | * | 5/1926 | Black ................... 251/174 |
| 2,191,232 | A | * | 2/1940 | Heinen ................. 251/174 |
| 3,047,265 | A | * | 7/1962 | Kaiser .................. 251/174 |
| 3,118,650 | A | * | 1/1964 | Cooper et al. ......... 251/174 |
| 3,219,047 | A | * | 11/1965 | Kircher, III et al. .... 251/315.03 |
| 3,233,862 | A | * | 2/1966 | Marsh .................. 251/174 |
| 3,254,873 | A | * | 6/1966 | Knox ................... 251/174 |
| 3,266,769 | A | | 8/1966 | Shand |
| 3,281,112 | A | * | 10/1966 | Walker ................. 251/174 |
| 3,387,815 | A | * | 6/1968 | Richards .............. 251/174 |
| 3,394,915 | A | * | 7/1968 | Gachot ................ 251/174 |
| 3,561,730 | A | * | 2/1971 | Hurst .................. 251/315.13 |
| 3,883,112 | A | * | 5/1975 | Milleville et al. ....... 251/174 |
| 4,155,536 | A | | 5/1979 | Saiki |
| 4,217,923 | A | * | 8/1980 | Kindersley ............ 251/174 |
| 4,319,734 | A | * | 3/1982 | Acar ................... 251/174 |
| 4,572,239 | A | * | 2/1986 | Koch et al. ........... 251/174 |
| 4,575,045 | A | * | 3/1986 | Martin et al. .......... 251/174 |

(Continued)

FOREIGN PATENT DOCUMENTS

WO    WO/03/083334 A1    10/2003

(Continued)

*Primary Examiner*—John Bastianelli
(74) *Attorney, Agent, or Firm*—Miller Matthias & Hull

(57) ABSTRACT

A valve assembly comprising a housing and a valve member mounted within the housing rotatable about an axis and between at least a dispensing position and a further position, for instance a volume selection position during which a material can be withdrawn from a container, and, preferably, a seat for mounting and guiding the valve member within the housing, wherein at least one of said housing, valve member, and seat is made of a synthetic material and the assembly further comprises a spring, which urges at least two of said housing, valve member, and seat together.

13 Claims, 2 Drawing Sheets

U.S. PATENT DOCUMENTS

| | | | |
|---|---|---|---|
| 4,651,775 A * | 3/1987 | Okada | 251/174 |
| 4,676,480 A * | 6/1987 | Garceau et al. | 251/174 |
| 5,078,302 A * | 1/1992 | Hellenberg | 222/135 |
| 5,305,986 A * | 4/1994 | Hunt | 251/174 |
| 5,356,041 A * | 10/1994 | Hellenberg et al. | 222/135 |
| 6,003,731 A * | 12/1999 | Post et al. | 222/135 |
| 6,065,736 A * | 5/2000 | Hunt | 251/174 |
| 6,273,298 B1 | 8/2001 | Post | |
| 6,595,240 B2 | 7/2003 | Leys et al. | |

FOREIGN PATENT DOCUMENTS

| | | |
|---|---|---|
| WO | WO-03/083334 A1 | 10/2003 |

* cited by examiner

VALVE ASSEMBLY FOR VISCOUS FLUID DISPENSERS

CROSS-REFERENCE TO RELATED APPLICATION

This application is a continuation-in-part of U.S. application Ser. No. 11/051,709 filed on Feb. 4, 2005, still pending.

BACKGROUND

1. Technical Field

A valve assembly, a pump for a viscous fluid, and an apparatus for dispensing fluids.

2. Background of the Related Art

Valve assemblies for viscous fluid dispensers are known e.g. from international patent application WO 03/083334. This document discloses a valve assembly for a fluid dispenser including a housing having at least a first opening (19) and a second opening (20), and a valve member fitted in the housing, the valve member (15) being rotatable about an axis and comprising a first channel (22), extending along said axis and communicating with the first opening in the housing, and at least two outlet channels (23, 24) radially extending from the first channel to the circumference of the valve member, wherein each of the radially extending outlet channels can be brought in register with the second opening by rotating the valve member.

U.S. Pat. No. 6,595,240 relates to a three-way plastic diaphragm valve provided with a rather complicated creep compensation system, which compensates for compression of internal valve components as well as extension of the valve body. In a manually operated three-way valve embodiment of U.S. Pat. No. 6,595,240, a trapped spring mechanism inserted between an actuator portion and an upper valve member provides the closure force for the upper valve member on the upper valve seat. An example of the spring mechanism is shown in FIG. 7.

Therefore, there is a need for a valve that comprises an effective and relatively straightforward means for creep compensation.

SUMMARY OF THE DISCLOSURE

In satisfaction of the aforenoted needs, a valve assembly is disclosed which comprises:

a housing and a valve member mounted within the housing rotatable about an axis and between at least a dispensing position and a further position, for instance a volume selection position during which a material can be withdrawn from a container, and, a seat for mounting and guiding the valve member within the housing, wherein at least one of said housing, valve member, and seat is made of a synthetic material and the assembly further comprises a spring, which urges at least two of said housing, valve member, and seat together.

In a refinement, the housing comprises an opening, preferably an outlet opening or an opening communicating with an outlet, surrounded by a first seat and the valve member comprises at least one radially extending (outlet) channel, which can be brought in register with the opening by rotating the valve member, wherein the said spring urges the valve member against this seat.

In a refinement, the housing comprises at least a second opening, preferably communicating with an inlet connected or connectable to a pump or a container, surrounded by a second seat, and wherein the valve member is clamped between the first and second seats by the said spring.

The disclosed valve assemblies can be manufactured in part or wholly from one or more synthetic materials and hence is relatively inexpensive when compared to similar valve assemblies made of metal. Creep resulting from the use of synthetic material(s) is compensated for in an effective manner, which preferably allows a relatively straightforward and robust design of the valve assembly.

A pump is also disclosed for a viscous fluid which comprises the disclosed valve assembly described above and a pump mechanism associated with the said assembly.

Finally, an apparatus for dispensing fluids is disclosed, which comprises:

a turntable rotatable around an axis of rotation;

a plurality of pumps attached to and distributed around the axis of the turntable;

at least one of the pumps comprising a valve assembly as described above.

BRIEF DESCRIPTION OF THE DRAWINGS

The disclosed valve assemblies, pumps and apparatuses will be further explained with reference to the accompanying drawings in which presently preferred embodiments are shown schematically.

It is noted that the drawings are not necessarily to scale and that details, which are not necessary for an understanding of the disclosed valve, may have been omitted.

The terms "upper", "lower", "horizontal", "vertical", "front", "rear", and the like relate to the embodiments as oriented in the figures. Further, elements that are at least substantially the same or that perform at least substantially the same function are denoted by the same numeral.

As a matter of course, the disclosure is not limited to the particular embodiments illustrated herein.

DETAILED DESCRIPTION OF THE PRESENTLY PREFERRED EMBODIMENTS

Figure 1:
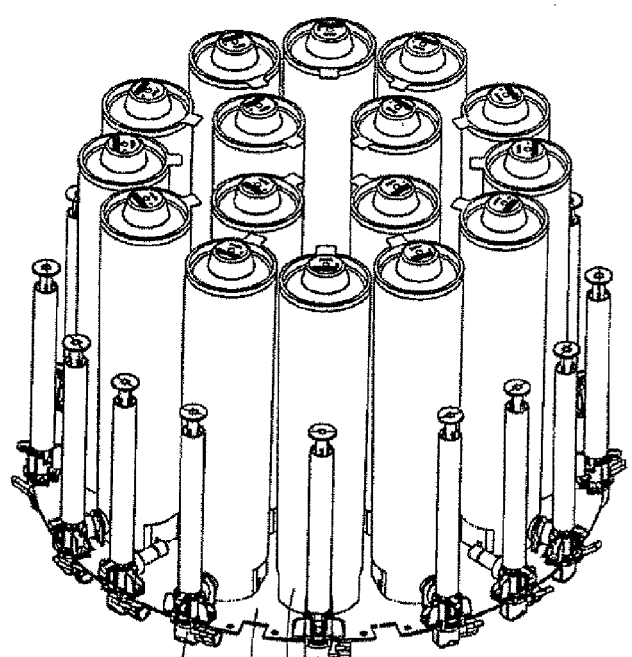
FIG. 1 is a perspective view of part of a disclosed apparatus for dispensing viscous fluids.

FIG. 1 illustrates the main parts of a preferred embodiment of an apparatus 1 for dispensing viscous fluids, such as shampoos, conditioners, foundations, hair dyes, and/or components thereof. Other examples of viscous fluids that can be dispensed with the apparatus 1 are colorants, base paints, and paint components for decorative purposes, such as masonry paints, and/or industrial purposes.

This particular dispensing apparatus 1 includes a turntable 2, which is rotatable about a vertical axis by means of a drive (not shown) in order to rotate the turntable 2 between discrete positions. On the turntable 2, there are mounted a plurality of pumps 3, e.g., sixteen pumps. Each pump 3 is associated with a fluid container 4 comprising a replaceable flexible package (not shown) contained in a rigid, removable holder. When a flexible package is empty, the package and the holder containing it can be removed. Subsequently, the holder can be opened to take out the empty package and to insert a new, filled package, upon which the holder and the filled package can be placed back in the original position. Further details of the said apparatus are disclosed in U.S. Pat. No. 6,273,298, the contents of which are incorporated herein by reference.

Figure 2:
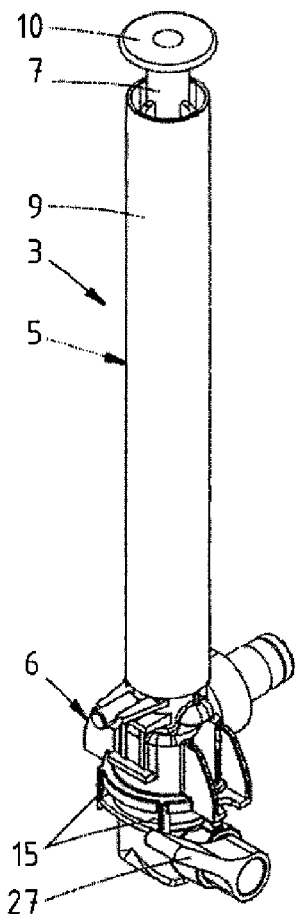
FIG. 2 is a perspective view of a disclosed valve assembly suitable for use in the apparatus of FIG. 1.
Figure 3:
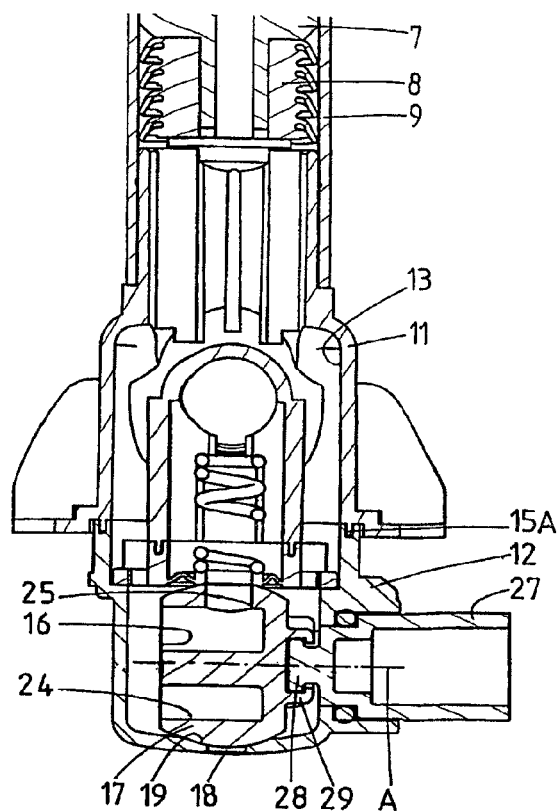
FIG. 3 is a cross-sectional front view of the valve assembly of FIG. 2.
Figure 4:
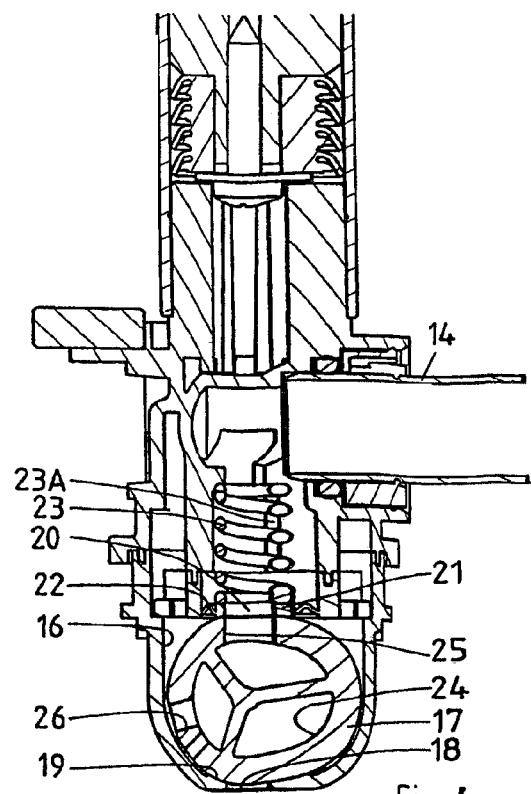
FIG. 4 is a cross-sectional side view of the valve assembly of FIG. 2.

FIGS. 2 to 4 show an embodiment of a pump 3 suitable for use in the apparatus of FIG. 1 and comprising a pump mechanism 5 and a valve assembly 6.

The pump mechanism 5 is of the piston-type and includes a piston rod 7 provided with a piston 8 (see FIGS. 2 and 3), disposed within a cylinder 9, and an upper flange 10. The flange 10 can be engaged by an actuator (not shown) adapted to move the piston rod 7 and the piston 8 upwards during an intake stroke and downwards during a discharge stroke. The actuator is stationary and the turntable 2 is adapted to position one pump 3 at a time in line with the actuator in order to enable it to actuate the pump mechanism 5.

The valve assembly 6 comprises an upper housing 11, onto which the cylinder 9 is mounted, and a lower housing 12. The upper housing 11 defines a first cavity 13 that communicates with the cylinder 9 and an inlet channel 14 that is separated from the cavity 13 and adapted to be in fluid communication with a fluid container 4 as shown in FIG. 1.

The lower housing 12 is snap-fitted to the upper housing 11 by means of a plurality of resilient fingers 15 (FIG. 2). The connection between the lower and upper housings 11, 12 is further supported by a tongue and groove joint 15A (FIG. 3) and, upon assembly of the apparatus shown in FIG. 1, by a flange (not shown) on the turntable 2. The lower housing 12 defines a second cavity 16, which communicates, via the first cavity 13, with the pump mechanism 5. A valve member, preferably a ball-shaped valve 17, is fitted inside the second cavity 16 rotatable about an axis A. The lower housing 12 further includes a first or outlet opening 18 surrounded by a first seat 19 forming an integral part of the bottom wall of the lower housing 12 and a second or inlet opening 20, which communicates with the inlet channel 14 and which is surrounded by a second seat 21. The second seat 21 is mounted in the upper housing 11 by means of a resilient membrane 22, which seals off the second cavity 16 with respect to the inlet channel 14.

At least the valve member 17 and the housings 11, 12 are made from a synthetic material, such as poly(oxymethylene) (POM), polyamide (PA or Nylon® or polyethylene (PE), e.g. by means of injection moulding. However, it is preferred that all parts described above are made from a synthetic material.

Further, it is generally preferred that at least one of the seats, preferably both, is curved and that the radius of curvature of the seat(s) is larger than the radius of the valve member, thus obtaining a tighter seal between the seat(s) and the valve member.

A helical spring 23, preferably made from a metal such as stainless steel (304 or 316) is located on top of the second seat 21, such that the valve member 17 is clamped between the two seats 19, 21, thus compensating for compression of internal valve components, in this example the seats 19, 21 and the valve member 17, as well as extension of the lower housing 12. The helical spring 23 is preferably positioned between guide members 23A. In an alternative embodiment, the membrane serves both as a seal and as a spring, obviating the need for a separate spring.

The valve member 17 includes first channels 24, extending along, i.e. co-axial with or parallel to, the axis A and discharging into the second cavity 16. It further includes an inlet channel 25 and an outlet channel 26, both radially extending from one of the first channels 24 to the circumference of the valve member 17. The valve member 17 can be operated by means of a lever 27 (FIGS. 1 and 3). To facilitate assembly, it is preferred that one end of the lever 27 is provided with a protrusion 28 or a slot, that the valve member 17 is provided with respectively a complementary slot 29 or protrusion, and that the protrusion 28 is slidingly received in the slot 29, preferably such that rotation of the lever 27 relative to the valve member 17 is substantially avoided.

FIGS. 3 and 4 show the intake position of the valve member 17, where the inlet channel 25 of the valve member 17 is in register with the second opening 20 and thus with the inlet channel 14. In this position, the cavities 13, 16 and cylinder 9 can be filled with a desired amount of the fluid from a container connected to the inlet channel 14 by moving the piston 8 upwards over a desired or predetermined length.

As soon as an appropriate amount of fluid has been taken in, the valve member 17 is rotated to the dispensing position, i.e. until the outlet channel 26 is in register the outlet opening 18, which in this particular embodiment amounts to a travel of respectively 50°, and the piston 8 is moved downwards to dispense the a desired amount of the fluid from the said opening 18.

The valve assembly according to the present embodiment is made for the greater part from one or more synthetic materials and hence relatively inexpensive when compared to valve similar valve assemblies made of metal. Creep resulting from the use of synthetic material is compensated for in an effective manner, allowing a relatively straightforward and robust design of the valve assembly.

Figure 5:
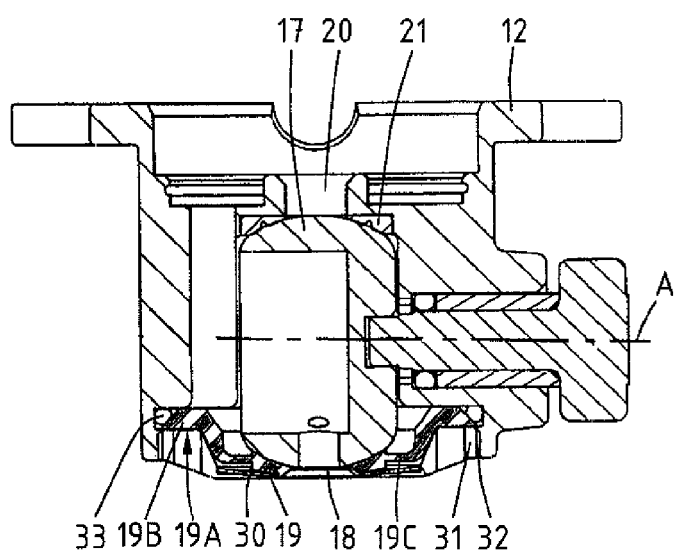
FIG. 5 is a cross-sectional front view of an alternative valve assembly.

FIG. 5 shows the lower part of a second preferred embodiment of a valve assembly, which is especially suitable for use in pumps that are, for the most part, made of metal. In this embodiment, a lower housing 12 defines a (second) cavity 16, which communicates, via an upper housing, with a pump mechanism. A valve member, preferably a ball-shaped valve 17, is fitted inside the second cavity 16 rotatable about an axis A. The lower housing 12 includes a first or outlet opening 18 surrounded by a first seat 19, formed by a separate seat part 19A, and a second or inlet opening 20, which communicates with an inlet channel and which is surrounded by a second seat 21.

In this embodiment, the valve member 17 and the housing 12 are made of a metal, such as stainless steel. The seats 19, 21 are made of a synthetic material, preferably polytetrafluoroethylene (PTFE or Teflon®), thus substantially preventing the surface of the ball valve or the seats from being scratched by dust particles or fouling or at least reducing the introduction of such scratches and, as a result, preventing or at least reducing the risk of leakage of fluid over time.

In accordance with the embodiment of FIG. 5, a spring, in this example a washer 30, preferably made of spring steel, is located between the first seat 19 and the bottom wall of the housing 12, such that the first (lower) seat 19 is urged upwards and the valve member 17 is clamped between the two seats 19, 21. Thus, creep resulting from the use of seats of a synthetic material is compensated for in an effective manner.

To facilitate insertion of the valve member 17, the seats 19, 21, and the spring 30 into the lower housing 12, the bottom wall of the lower housing 12 is provided with a lid 31, detachably mounted in the housing 12, preferably by means of a threaded connection 32.

The seat part 19 comprises, in addition to the seat 19 itself, an outer ring 19B, which is retained between the lid 31 and the lower housing 12 and which renders the connection 32 of the lid 31 to the lower housing 12 substantially fluid-tight, alone or, as in this example, in conjunction with a gasket 33. The seat part 19 further comprises a relatively thin and resilient connection 19C between the outer ring 19B and the seat 19. This construction of the seat part 19A allows relatively easy assembly and accurate positioning of the seat 19 and facilitates displacement of this seat under the force of the spring 30 and towards the valve member 17.

The disclosed valve assemblies are not restricted to the embodiments shown in the drawings and described above. For example, the valve member can be provided with two or more outlet channels having different diameters, so as to facilitate dispensing different (larger and smaller) volumes. Also, the valve assembly can be mounted directly onto or into (the bottom part of) a container, i.e., without the presence of a pump mechanism.

As a matter of course, this disclosure is not restricted to the above-disclosed embodiment and can be varied in numerous ways while still falling within the scope of the appended claims. For instance, the spring can be located inside a resilient valve member urging it to expand or could take the shape of a resilient bracket mounted about at least the valve member and the housing thus urging the same together.

What is claimed is:

1. A valve assembly comprising:
    a housing comprising a first outlet opening and a second inlet opening,
    a valve member mounted within the housing rotatable about an axis and between at least a dispensing position and a further position,
    a first seat surrounding the first outlet opening for mounting and guiding the valve member within the housing, the first seat comprising an outer ring connected to the housing and an inner seat ring that surrounds the first inlet opening, the outer ring and inner seat ring being connected by an annular resilient section extending therebetween, the outer ring, the inner seat ring, and the annular resilient section being integrally made of same material,
    a second seat surrounding the second inlet opening, the second seat being sandwiched between the housing and the valve member without any spring element disposed between the housing and the second seat, and
    the assembly further comprises a spring disposed between the at least one of the annular resilient section and inner seat ring of the first seat and the housing, the spring abutting the at least one of the annular resilient section and inner seat ring of the first seat and biasing the first seat against the valve member and the valve member against the second seat to clamp the valve member between the first and second seats and the valve member away from the first outlet opening and towards the second inlet opening.

2. The valve assembly of claim 1, wherein the valve member comprises at least one radially extending channel, which can be brought into registry with the first outlet opening by rotating the valve member.

3. The valve assembly of claim 2, wherein the second inlet opening communicates with a pump.

4. The valve assembly of claim 2, wherein the housing defines a cavity which communicates with a pump mechanism, and
    the valve member comprises a channel which extends along the rotational axis of the valve member and communicates with the cavity.

5. The valve member of claim 4, wherein the valve member comprises a further radially extending channel, and
    wherein the further channel can be brought in registry with the second inlet opening by rotating the valve member.

6. The valve assembly of claim 2, wherein the first seat is curved and wherein the radius of curvature of the first seat is larger than a radius of the valve member.

7. The valve assembly of claim 2, wherein the first seat is made of a synthetic material.

8. The valve assembly of claim 7, wherein the spring comprises a washer.

9. The valve assembly of claim 1, further comprising a lever for rotating the valve member and
    wherein one end of the lever is provided with one of a protrusion or a slot, and the valve member is provided respectively with one of a complementary slot or protrusion, and
    wherein the protrusion is slidably received in the slot.

10. The valve assembly of claim 1, wherein the valve member is ball-shaped.

11. A pump for a viscous fluid comprising the valve assembly of claim 1 and a pump mechanism associated with said assembly.

12. An apparatus for dispensing fluids, comprising:
    a turntable rotatable around an axis of rotation;
    a plurality of pumps attached to and distributed around the axis of the turntable;
    at least one of the pumps comprising a valve assembly according to claim 1.

13. A valve assembly comprising:
    a housing comprising a first outlet opening and a second inlet opening,
    a valve member mounted within the housing rotatable about an axis and between at least a dispensing position and a further position,
    a first seat surrounding the first outlet opening for mounting and guiding the valve member within the housing, the first seat comprising an outer ring connected to the housing and an inner seat ring that surrounds the first inlet opening, the outer ring and inner seat ring being connected by an annular resilient section extending therebetween, the outer ring, the inner seat ring, and the annular resilient section being integrally made of same material and the outer ring being retained between the housing and a lid detachably mounted in the housing,
    a second seat surrounding the second inlet opening, the second seat being sandwiched between the housing and the valve member without any spring element disposed between the housing and the second seat, and
    the assembly further comprises a spring disposed between the at least one of the annular resilient section and inner seat ring of the first seat and the housing, the spring abutting the at least one of the annular resilient section and inner seat ring of the first seat and biasing the first seat against the valve member and the valve member against the second seat to clamp the valve member between the first and second seats and the valve member away from the first outlet opening and towards the second inlet opening.

* * * * *